US012717901B2

(12) United States Patent
Boehm et al.

(10) Patent No.: US 12,717,901 B2
(45) Date of Patent: Aug. 25, 2026

(54) TRAINING PROCEDURE CHANGE DETERMINATION TO DETECT ATTACK

(71) Applicant: Micron Technology, Inc., Boise, ID (US)

(72) Inventors: Aaron P. Boehm, Boise, ID (US); David Hulton, Seattle, WA (US); Jeremy Chritz, Seattle, WA (US); Tamara Schmitz, Scotts Valley, CA (US); Max S. Vohra, Seattle, WA (US)

(73) Assignee: Micron Technology, Inc., Boise, ID (US)

( * ) Notice: Subject to any disclaimer, the term of this patent is extended or adjusted under 35 U.S.C. 154(b) by 1024 days.

(21) Appl. No.: 17/653,264

(22) Filed: Mar. 2, 2022

(65) Prior Publication Data

US 2023/0205873 A1 Jun. 29, 2023

Related U.S. Application Data

(60) Provisional application No. 63/266,147, filed on Dec. 29, 2021.

(51) Int. Cl.
*G06F 21/55* (2013.01)
*G06F 3/06* (2006.01)
(Continued)

(52) U.S. Cl.
CPC .......... *G06F 21/554* (2013.01); *G06F 3/0604* (2013.01); *G06F 3/0655* (2013.01);
(Continued)

(58) Field of Classification Search
CPC .... G06F 21/554; G06F 3/0604; G06F 3/0655; G06F 3/0673; G06F 9/4411;
(Continued)

(56) References Cited

U.S. PATENT DOCUMENTS 11,461,163 B1 * 10/2022 Aggarwal ........... G06F 11/0787
12,079,145 B2 * 9/2024 Ruttenberg ......... G06F 13/1668
(Continued)

OTHER PUBLICATIONS

"International Search Report and Written Opinion of the International Searching Authority," issued in connection with Int'l Appl. No. PCT/US2022/081971, dated May 2, 2023 (9 pages).

*Primary Examiner* — Michael T Tran
(74) *Attorney, Agent, or Firm* — Holland & Hart LLP

(57) ABSTRACT

Methods, systems, and devices for training procedure change determination to detect an attack are described. A host device may perform one or more training procedures to train aspects of a memory device (e.g., a dynamic random-access memory (DRAM) component). A training procedure may depend on a current (e.g., present, within a threshold duration) metric associated with the memory device, such as a current channel metric for a channel between the memory device and the host device. The host device, memory device, or another device, may store a set of reference values associated with a training procedure and may compare a result of a training procedure to a reference value of the set to determine whether the training procedure has changed. If the training procedure or a related value has changed, the memory device may disable one or more features of the memory device to protect against a potential attack.

35 Claims, 8 Drawing Sheets

(51) Int. Cl.
*G06N 20/00* (2019.01)
*G06F 9/4401* (2018.01)

(52) U.S. Cl.
CPC ........... *G06F 3/0673* (2013.01); *G06N 20/00* (2019.01); *G06F 9/4411* (2013.01); *G06F 2221/034* (2013.01)

(58) Field of Classification Search
CPC ........... G06F 2221/034; G06F 13/1668; G06F 21/562; G06F 21/57; G06N 20/00; G11C 7/24; G11C 29/022; G11C 29/023; G11C 29/028
USPC .......................................... 365/185.2, 230.06
See application file for complete search history.

(56) References Cited

U.S. PATENT DOCUMENTS

| | | | | |
|---|---|---|---|---|
| 12,158,977 | B1* | 12/2024 | Ramakrishnan | G06F 21/72 |
| 2003/0065260 | A1* | 4/2003 | Cheng | A61B 8/0833 600/427 |
| 2009/0019323 | A1* | 1/2009 | Porterfield | G06F 13/4243 714/E11.002 |
| 2011/0289025 | A1* | 11/2011 | Yan | G06N 5/025 706/47 |
| 2015/0294250 | A1* | 10/2015 | Anerousis | G06Q 10/0635 705/7.28 |
| 2016/0224412 | A1* | 8/2016 | Healy | G06F 11/1024 |
| 2016/0246668 | A1 | 8/2016 | Wang, III | |
| 2017/0286679 | A1 | 10/2017 | Khare et al. | |
| 2018/0018583 | A1 | 1/2018 | Cha | |
| 2018/0018740 | A1* | 1/2018 | Unsal | G06N 20/00 |
| 2019/0004983 | A1* | 1/2019 | Mizumoto | G06F 13/1673 |
| 2019/0034365 | A1* | 1/2019 | Lovelace | G06F 13/1684 |
| 2019/0079699 | A1 | 3/2019 | Lee et al. | |
| 2019/0087695 | A1* | 3/2019 | Inoue | G06V 20/41 |
| 2020/0042209 | A1 | 2/2020 | Morris et al. | |
| 2020/0293116 | A1* | 9/2020 | Udall | G06V 10/147 |
| 2020/0381098 | A1* | 12/2020 | Edwards | G16H 40/67 |
| 2021/0165426 | A1* | 6/2021 | White | G05D 1/101 |
| 2021/0311055 | A1* | 10/2021 | McDevitt | G01N 33/548 |
| 2022/0391080 | A1* | 12/2022 | Markiewicz | G06F 9/451 |
| 2024/0069767 | A1* | 2/2024 | Paithankar | G06F 3/067 |
| 2024/0168817 | A1* | 5/2024 | Bahirat | G06F 9/5072 |
| 2024/0329838 | A1* | 10/2024 | Willey | G06F 1/12 |

* cited by examiner

500

TRAINING PROCEDURE CHANGE DETERMINATION TO DETECT ATTACK

CROSS REFERENCE

The present Application for Patent claims the benefit of U.S. Provisional Patent Application No. 63/266,147 by BOEHM et al., entitled "TRAINING PROCEDURE CHANGE DETERMINATION TO DETECT ATTACK," filed Dec. 29, 2021, assigned to the assignee hereof, and expressly incorporated by reference herein.

FIELD OF TECHNOLOGY

The following relates generally to one or more systems for memory and more specifically to training procedure change determination to detect an attack.

BACKGROUND

Memory devices are widely used to store information in various electronic devices such as computers, user devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

DETAILED DESCRIPTION

Figure 1:
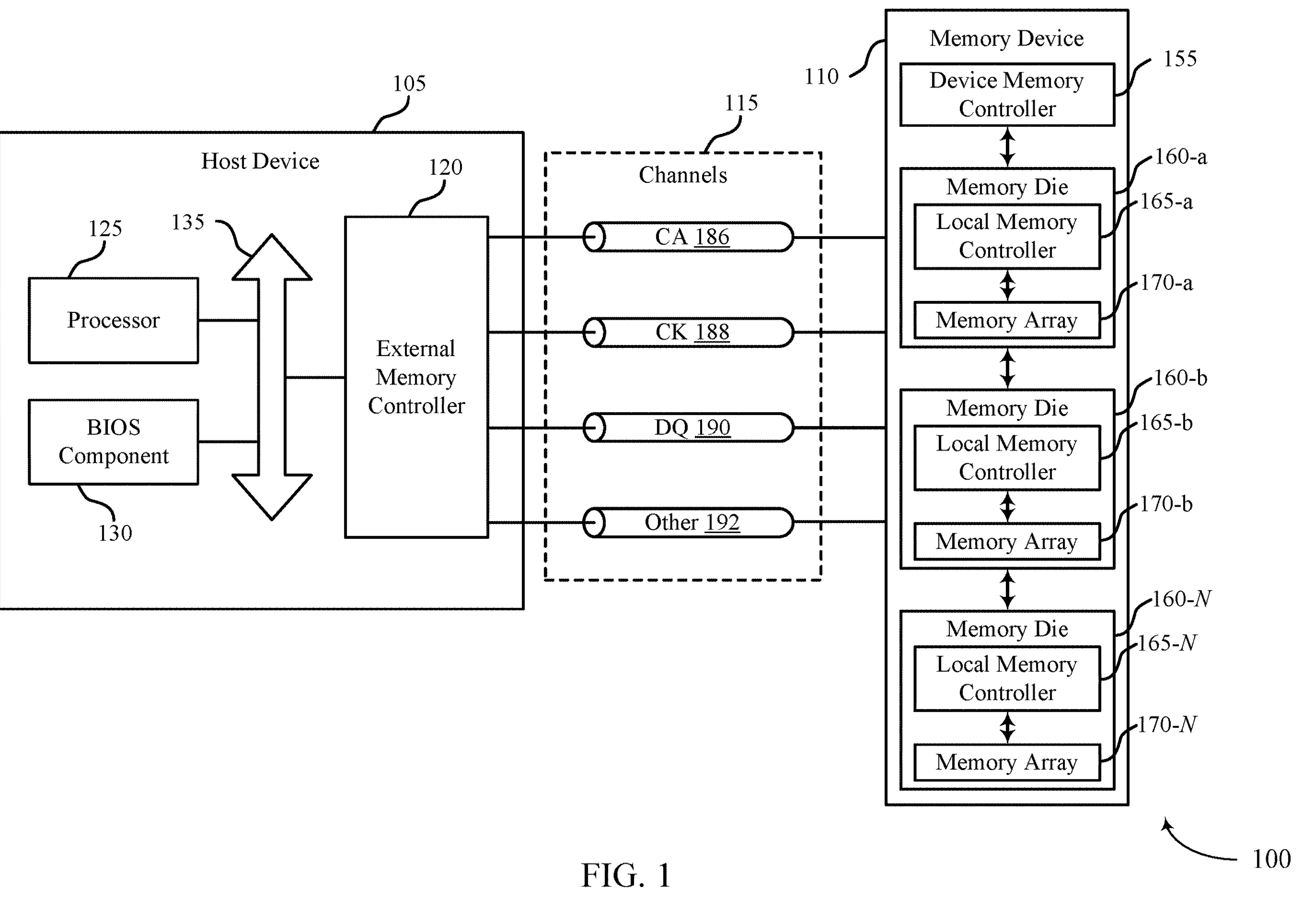
FIGS. 1 and 2 illustrate examples of systems that support training procedure change determination to detect an attack in accordance with examples as disclosed herein.

A system, such as an automotive system (e.g., a vehicle), may include a host device coupled with a memory device. The host device and the memory device may communicate information (e.g., commands, data) using signaling over one or more channels between the host device and the memory device. In some cases, an attack on the memory device may affect one or more channel characteristics between the memory device and the host device. For example, modifying a printed circuit board (PCB) at the memory device (e.g., by adding an interposer, modifying cabling, modifying a socket, or some combination thereof) may change a characteristic of the one or more channels between the memory device and the host device. Additionally or alternatively, removing the memory device or a component of the memory device (e.g., a dynamic random access memory (DRAM) component) from the system may change a characteristic of the one or more channels between the host device and the memory device or the component of the memory device. In some examples, an unauthorized user (e.g., a hacker, a customer) may remove the memory device, such as the DRAM, or otherwise modify the memory device to capture secure communications or read secure information, among other examples, from the memory device, such as the DRAM. Detecting such an attack, before the attack occurs or even as the attack occurs, may allow the memory device to perform operations to mitigate the theft of secure or other information and prevent future theft of secure or other information.

As disclosed herein, a system may support one or more techniques for performing training for the memory device, such as the DRAM component of the memory device, to detect possible attacks. A training procedure for the DRAM may depend on channel characteristics between the DRAM and a host device. Additionally, removal of the DRAM or adding other components to the memory device, may change the channel characteristics and, correspondingly, affect the training procedure. The system may use one or more training procedures to determine a change in channel characteristics and detect that the system is under attack. To support the detection of a memory device attack, a host device of the system may perform trainings with the DRAM component prior to a potential attack (e.g., during production) and may store reference training values for future comparison. For example, the host device may perform training procedures with the DRAM component for multiple data points (e.g., at different temperature values, at different voltages of the DRAM component, at different speeds of the DRAM component, or any other data points) and the resulting training values (e.g., a voltage reference (VREF) value, a clock adjustment) may be stored, for example, as reference values. The host device, the memory device, or another memory device in communication with the host device, may store the reference values (e.g., in non-volatile memory) for comparison to future values, such as values related to trainings. In some cases, an attack on the memory device, such as the DRAM component, may cause variations to expected training values. For example, in a VREF training procedure, if an attacker removes the DRAM, the value of the VREF setting for the training may be different than the expected reference value. The expected reference value may be selected based on conditions or current (e.g., temporal) metrics (e.g., temperature of the channel) for the reference value being similar to those of the current conditions or metrics (e.g., when the training procedure is performed). A change in the result of the training procedure (e.g., as compared to the expected reference value) may trigger corrective action at the memory device. For example, the host device may disable one or more features of the memory device based on or in response to the detected change in the training procedure. By taking corrective action, such as disabling the one or more features, the memory device may effectively lock or limit specific functionality or some information to protect secure information against attack (e.g., by refraining from using security keys, locking access to specific data, refraining from communicating specific data, or otherwise locking functionality that involves potential security risks).

Features of the disclosure are initially described in the context of systems as described with reference to FIGS. 1 and 2. Additional features of the disclosure are described in the context of a flow diagram as described with reference to FIG. 3. These and other features of the disclosure are further illustrated by and described with reference to an apparatus diagram and flowcharts that relate to training procedure change determination to detect an attack as described with reference to FIGS. 4 through 8.

FIG. 1 illustrates an example of a system 100 that supports training procedure change determination to detect an attack in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system operable to store data for one or more other components of the system 100.

At least portions of the system 100 may be examples of the host device 105. The host device 105 may be an example of a processor or other circuitry within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host or a host device 105.

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other factors.

The memory device 110 may be operable to store data for the components of the host device 105. In some examples, the memory device 110 may act as a secondary-type or dependent-type device to the host device 105 (e.g., responding to and executing commands provided by the host device 105 through the external memory controller 120). Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide control or other functionality for at least portions of the system 100 or at least portions of the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include a program or software stored in one or more of read-only memory (ROM), flash memory, or other non-volatile memory.

In some examples, the system 100 or the host device 105 may include an I/O controller. An I/O controller may manage data communication between the processor 125 and the peripheral component(s), input devices, or output devices. The I/O controller may manage peripherals that are not integrated into or with the system 100 or the host device 105. In some examples, the I/O controller may represent a physical connection or port to external peripheral components.

In some examples, the system 100 or the host device 105 may include an input component, an output component, or both. An input component may represent a device or signal external to the system 100 that provides information, signals, or data to the system 100 or its components. In some examples, and input component may include a user interface or interface with or between other devices. In some examples, an input component may be a peripheral that interfaces with system 100 via one or more peripheral components or may be managed by an I/O controller. An output component may represent a device or signal external to the system 100 operable to receive an output from the system 100 or any of its components. Examples of an output component may include a display, audio speakers, a printing device, another processor on a printed circuit board, and others. In some examples, an output may be a peripheral that interfaces with the system 100 via one or more peripheral components or may be managed by an I/O controller.

The memory device 110 may include a device memory controller 155 and one or more memory dies 160 (e.g., memory chips) to support a desired capacity or a specified capacity for data storage. Each memory die 160 (e.g., memory die 160-*a*, memory die 160-*b*, memory die 160-N) may include a local memory controller 165 (e.g., local memory controller 165-*a*, local memory controller 165-*b*, local memory controller 165-N) and a memory array 170 (e.g., memory array 170-*a*, memory array 170-*b*, memory array 170-N). A memory array 170 may be a collection (e.g., one or more grids, one or more banks, one or more tiles, one or more sections) of memory cells, with each memory cell being operable to store at least one bit of data. A memory device 110 including two or more memory dies 160 may be referred to as a multi-die memory or a multi-die package or a multi-chip memory or a multi-chip package.

The device memory controller 155 may include circuits, logic, or components operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may receive data or commands or both from the host device 105. For example, the memory device 110 may receive a write command indicating that the memory device 110 is to store data for the host device 105 or a read command indicating that the memory device 110 is to provide data stored in a memory die 160 to the host device 105.

A local memory controller 165 (e.g., local to a memory die 160) may include circuits, logic, or components operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other circuits or controllers operable for supporting described operations of the device memory controller 155 or local memory controller 165 or both.

The external memory controller 120 may be operable to enable communication of one or more of information, data, or commands between components of the system 100 or the host device 105 (e.g., the processor 125) and the memory device 110. The external memory controller 120 may convert or translate communications exchanged between the components of the host device 105 and the memory device 110. In some examples, the external memory controller 120 or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be examples of transmission mediums that carry information between the host device 105 and the memory device. Each channel 115 may include one or more signal paths or transmission mediums (e.g., conductors) between terminals associated with the components of the system 100. A signal path may be an example of a conductive path operable to carry a signal. For example, a channel 115 may include a first terminal including one or more pins or pads at the host device 105 and one or more pins or pads at the memory device 110. A pin may be an example of a conductive input or output point of a device of the system 100, and a pin may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, CA channels 186 may be operable to communicate commands between the host device 105 and the memory device 110 including control information associated with the commands (e.g., address information). For example, commands carried by the CA channel 186 may include a read command with an address of the desired data. In some examples, a CA channel 186 may include any quantity of signal paths to decode one or more of address or command data (e.g., eight or nine signal paths).

In some examples, clock signal channels 188 may be operable to communicate one or more clock signals between the host device 105 and the memory device 110. Each clock signal may be operable to oscillate between a high state and a low state, and may support coordination (e.g., in time) between actions of the host device 105 and the memory device 110. In some examples, the clock signal may be single ended. In some examples, the clock signal may provide a timing reference for command and addressing operations for the memory device 110, or other system-wide operations for the memory device 110. A clock signal therefore may be referred to as a control clock signal, a command clock signal, or a system clock signal. A system clock signal may be generated by a system clock, which may include one or more hardware components (e.g., oscillators, crystals, logic gates, transistors).

In some examples, data channels 190 may be operable to communicate one or more of data or control information between the host device 105 and the memory device 110. For example, the data channels 190 may communicate information (e.g., bi-directional) to be written to the memory device 110 or information read from the memory device 110.

In some examples, the one or more other channels 192 may include one or more error detection code (EDC) channels. The EDC channels may be operable to communicate error detection signals, such as checksums, to improve system reliability. An EDC channel may include any quantity of signal paths.

Signals communicated over the channels 115 may be modulated using one or more different modulation schemes. In some examples, a binary-symbol (or binary-level) modulation scheme may be used to modulate signals communicated between the host device 105 and the memory device 110. A binary-symbol modulation scheme may be an example of a M-ary modulation scheme where M is equal to two. Each symbol of a binary-symbol modulation scheme may be operable to represent one bit of digital data (e.g., a symbol may represent a logic 1 or a logic 0). Examples of binary-symbol modulation schemes include, but are not limited to, non-return-to-zero (NRZ), unipolar encoding, bipolar encoding, Manchester encoding, pulse amplitude modulation (PAM) having two symbols (e.g., PAM2), and/or others.

In some examples, a multi-symbol (or multi-level) modulation scheme may be used to modulate signals communicated between the host device 105 and the memory device 110. A multi-symbol modulation scheme may be an example of a M-ary modulation scheme where M is greater than or equal to three. Each symbol of a multi-symbol modulation scheme may be operable to represent more than one bit of digital data (e.g., a symbol may represent a logic 00, a logic 01, a logic 10, or a logic 11). Examples of multi-symbol modulation schemes include, but are not limited to, PAM3, PAM4, PAM8, etc., quadrature amplitude modulation (QAM), quadrature phase shift keying (QPSK), and/or others. A multi-symbol signal (e.g., a PAM3 signal or a PAM4 signal) may be a signal that is modulated using a modulation scheme that includes at least three levels to encode more than one bit of information. Multi-symbol modulation schemes and symbols may alternatively be referred to as non-binary, multi-bit, or higher-order modulation schemes and symbols.

In some examples, the system 100 may be an example of an automotive system (e.g., a vehicle). For example, the host device 105 and the memory device 110 may both be components of a vehicle, and the host device 105, the memory device 110, or both may be further coupled with other components of the vehicle. In some cases, a system 100 may be susceptible to attacks from hackers or other users. For example, a user (e.g., a hacker) may probe a memory device 110, such as a DRAM bus or another type of memory device or component, to determine information from the memory device 110. In this way, the user may gain access to secure information or components (e.g., firmware, keys, plaintext data) of the memory device 110 that is intended to be hidden from or inaccessible to the user. Secure information may be information stored at a device (e.g., a vehicle) or information communicated in an ecosystem (e.g., between the vehicle and other devices or cloud components). In some cases, a user may manipulate information at the vehicle or communication information to trigger specific responses, access specific data, or cause other responses at the memory device 110. Secure information may be especially susceptible while a memory device 110 is in an idle state (e.g., operating in a relatively low power mode), which may occur in some vehicle situations, such as when the vehicle is idle for a given duration. Some memory devices 110, such as low-power double data rate (LPDDR) DRAM memory devices, may remain in an idle state for significant periods of time (e.g., days, weeks), during which a user (e.g., a hacker) may attempt to retrieve information (e.g., information that should be otherwise restricted from the user) from the memory device 110. Some vehicle systems may utilize LPDDR DRAM memory for improved power efficiency, but the LPDDR DRAM memory may be potentially susceptible to attacks while the vehicle is parked.

A user (e.g., a hacker) may perform one or more different types of attacks to try to access secure information at a memory device 110. In a first example, the user may physically remove the memory device 110 or a portion of the memory device 110 from the system 100 (e.g., from the vehicle). For example, while the vehicle is turned off and the memory device 110 is in an idle state, the user may remove the memory device 110 and probe the memory device 110 for information (e.g., by detecting information on a DRAM or bus, by putting the memory device 110 into a reader to read out information, or using some other technique). In some cases, the user may remove the DRAM component (e.g., from or as part of a PCB) at the memory device 110, may install an interposer with a breakout cable, and may capture DRAM traffic using a protocol analyzer. In some other cases, the user may freeze the DRAM, other memory device components, or both (e.g., using a substance to supercool the memory device 110 relatively quickly), then remove the cooled memory device 110, and probe the removed memory device 110. For example, the user may remove the DRAM ball grid array (BGA) component from the PCB, solder down the DRAM socket, and install a different DRAM in the socket. This different DRAM may be programmed with data during operation of the vehicle. After the memory device enters a lower power mode such as a sleep mode (e.g., persisting data in RAM), the user may supercool the DRAM (e.g., with freeze spray) and remove the cooled DRAM. Supercooling the DRAM may cause the array to retain at least some data without performing a refresh operation for a significant period of time. The user may place the removed DRAM in another socket board that may be unlocked or have additional test equipment to read the contents of the array, searching for keys to decrypt the secure storage. The user may capture a significant quantity of information (e.g., terabytes of data) over a period of time (e.g., one or more days) while the memory device 110 is removed using one or more of these techniques.

In a second example, a user may probe the memory device 110 while the memory device 110 is in place within the system 100 (e.g., without removing the memory device 110 or a portion of the memory device 110 from the vehicle). For example, if a vehicle remains idle (e.g., parked) for a significant time period (e.g., multiple days or weeks), the user may probe the memory device 110 in place over the course of a few days or a longer duration. Similar to the first example, the user may capture a significant quantity of information (e.g., terabytes of data) over a period of time (e.g., one or more days) without removing the memory device 110 from the system 100.

In a third example, a user may install a third-party device within the system 100 (e.g., on a vehicle, for example, without the knowledge of the vehicle's owner). The third-party device may read or gather information from the memory device 110 and may transmit the information back to the user (e.g., in real-time or according to some periodicity or trigger condition). In some cases, the added third-party device may read information while the vehicle is in operation. For example, the third-party device may use a DRAM logic analyzer or another component to perform channel analysis on the memory device 110, the host device 105, or both. The third-party device may capture and transmit information to the user while the vehicle is parked, while the vehicle is operating, or a combination thereof.

As described herein, if a memory device 110 or a portion of a memory device 110 is removed from the system 100 or if the memory device 110 is modified independent of the original equipment manufacturer (OEM), channel conditions for one or more channels 115 may change. Accordingly, the system 100 may detect one or more types of attacks on the memory device 110 based on detecting a change in a channel characteristic for a channel 115 using a training procedure between the host device 105 and a DRAM component of the memory device 110. In some cases, during production or before leaving the OEM, reference values may be determined for one or more training procedures. To support detection of an attack, the host device 105 and the DRAM component may perform a training procedure and compare a result of the training procedure (e.g., a training value) to a reference value based on a current metric or measurement. In some cases, a difference between the training value and the reference value that satisfies a threshold may indicate that there is or has been an attack on the memory device. As such, the memory device 110 may take corrective action, such as disabling one or more features (e.g., lock specific functionality to protect secure information against attack) in response to the host device 105 detecting the change in a training procedure (e.g., as compared to a stored reference value).

Though some examples may be described herein in terms of DRAM, ferroelectric RAM (FeRAM), or other capacitive-based memory types, it is to be understood that aspects of the teachings herein may be applied to any memory device (e.g., various types and combinations of volatile memory, non-volatile memory, or some combinations of both). Additionally, although some examples may be described herein in terms of vehicles and automotive systems, it is to be understood that the teachings herein may be applied to any system and various examples outside of the vehicle context, which is merely one example implementation.

Figure 2:
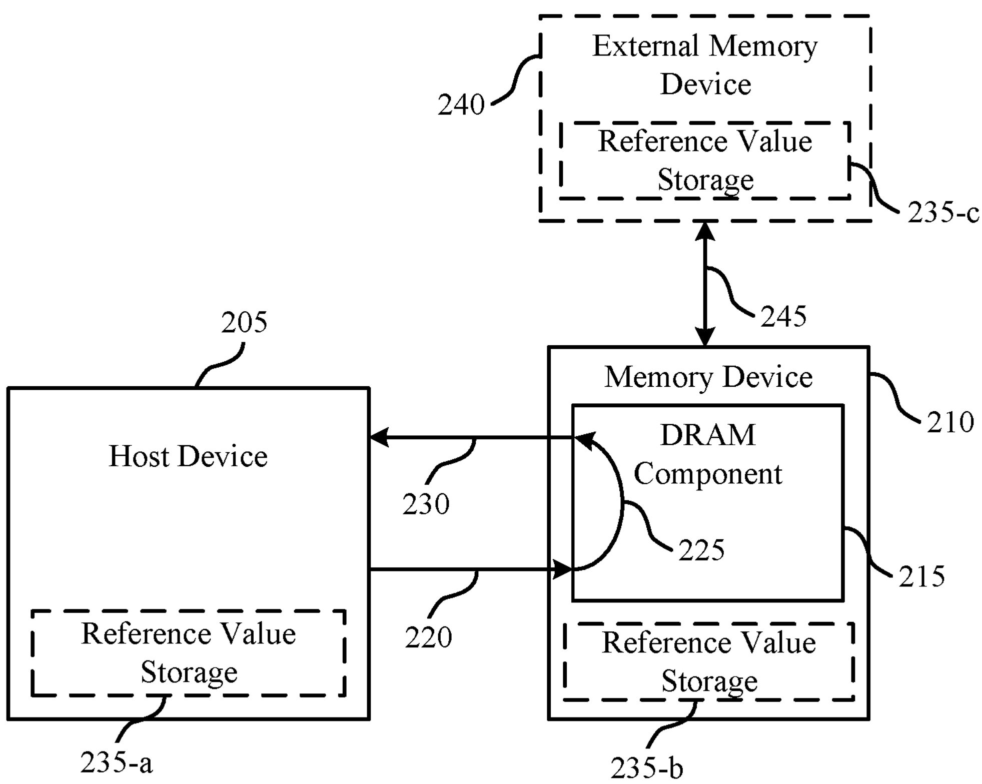

FIG. 2 illustrates an example of a system 200 that supports training procedure change determination to detect an attack in accordance with examples as disclosed herein. The system 200 may be an example of a system 100 as described with reference to FIG. 1. For example, the system 200 may be an example of an automotive system, such as a vehicle. The system 200 may include a host device 205 and a memory device 210, which may be examples of the corresponding devices described with reference to FIG. 1. The host device 205 may be coupled with the memory device 210, such that the host device 205 may issue signals to and receive signals from the memory device 210 over one or more channels, such as the channels 115 described with reference to FIG. 1. In some cases, the memory device 210 may include a DRAM component 215 in communication with the host device 205. The host device 205 may use training procedures between the host device 205 and the memory device 210 to detect attacks on the memory device 210 (e.g., attacks on the DRAM component 215).

The host device 205 and the DRAM component 215 may perform one or more initial training procedures (e.g., during production) to determine one or more reference values. For example, after final assembly of the PCB, an integrator may run multiple training procedures for the memory device 210 (e.g., training procedures dependent on a channel between the memory device 210 and the host device 205) to determine a set of reference values. The reference values may be resultant values from the initial training procedures, where each reference value corresponds to a specific set of conditions (e.g., pre-defined test points for reference). The resultant values for a training procedure may be VREF values, termination values, clock alignment information, or any other values determined based on a training procedure. For example, the training procedure may optimize one or more aspects of the channel between the host device 205 and the DRAM component 215, such as the data throughput (e.g., optimizing the data eye).

In some cases, the initial training data points may form a set of training reference values which may be stored in a reference value storage 235. For example, during production, trainings may be performed to determine reference values at different voltages of the DRAM component 215, different speeds of the DRAM component 215, different temperatures associated with the channel between the host device 205 and the memory device 210, or any combination thereof. In other words, multiple trainings may be performed at varying operating conditions to create a set of reference values for later comparison. These reference values may correspond to normal operating values under specific operating conditions. As such, deviations from these operating values (e.g., under the same or similar operating conditions) may indicate a change in the system 200. In some cases, a change in the system 200 may indicate an attack on the memory device 210, such as a removal of the DRAM component 215.

The host device 205 may store the set of reference values associated with one or more training procedures in non-volatile memory. However, in some cases, the host device 205 may store the set of reference values external to the DRAM component 215 of the memory device 210 to ensure that the reference values are still accessible even if the DRAM component 215 is removed (e.g., as part of an attack by a malicious user). In some cases, a reference value storage 235-*a* may be located within the host device 205 (e.g., in non-volatile memory at the host device), which may ensure that the reference values are not removed with the DRAM component 215 in the event of an attack. The host device 205 may write (e.g., program) the set of reference values to the reference value storage 235-*a* at the host device 205. In some other cases, a reference value storage 235-*b* may be located at the memory device 210, separate from the DRAM component 215. For example, the host device 205 may write (e.g., program) the set of reference values to non-volatile memory at the memory device 210 external to the DRAM component 215. In yet some other cases, a reference value storage 235-*c* may be in a separate, external memory device 240, external to both the host device 205 and the memory device 210, which may be coupled with the memory device 210 via a channel 245. As such, modifications to the memory device 210 may not affect the reference values stored in the reference value storage 235-*c* at the external memory device 240. The reference values may be stored in one or more examples of the reference value storage 235. In some examples, the host device 205, the memory device 210, or both may additionally log the respective operating conditions corresponding to each reference value to the non-volatile memory, such that the host device 205, the memory device 210, or both may look up a relevant reference value based on one or more operating conditions (e.g., a temperature, a voltage of the DRAM component 215, a speed of the DRAM component 215).

In some cases, training procedures and the reference values may be used to detect that a component has been attached to or in contact with the channel in order to sweep the bus or facilitate easy removal of the DRAM component 215. For example, modifying a PCB at the memory device 210 (e.g., by adding an interposer, modifying or adding cabling, modifying or adding a socket, or some combination thereof) may affect the resultant value for a training procedure. Additionally or alternatively, removing the memory device 210 or the DRAM component 215 from the system 200 may affect the resultant value for the training procedure. That is, modifying the PCB may change characteristics of the memory channel, correspondingly causing the channel training results to be different before and after the modification. Therefore, any training that may be dependent on characteristics of the channel between the memory device 210, the DRAM component 215, or the host device 205 may be useful in determining possible interference by an attacker. Such trainings may include, but are not limited to, VREF training, clock alignment, or termination value training, other trainings, or any combination there. Additionally or alternatively, the host device 205, the memory device 210, or both may use any training defined within an industry standard or specification (e.g., a JEDEC LPDDR specification) or any other training performed by a system 200. Accordingly, the host device 205, the memory device 210, or both may reuse training procedures to achieve multiple objectives: train the memory device 210 (e.g., the DRAM component 215) to improve performance while concurrently testing for modifications to the memory device 210. In some cases, training procedures may be performed in order to monitor the health of the memory device 210.

The reference values written to the reference value storage 235 from trainings performed during production (e.g., by an integrator after final assembly of the memory device 210)—for example, prior to possible attack on the memory device 210—may be used to evaluate if a current training is within a range (e.g., is "normal") or if the DRAM component 215 may be under attack. In some examples, when a triggering event occurs (e.g., boot up of the memory device 210 or another trigger event), the host device 205 may perform a training procedure with the DRAM component 215. For example, if a VREF training is performed, the host device 205 may determine a VREF value corresponding to an "optimal" data eye (e.g., a data eye satisfying a threshold performance metric). The determined value of VREF (e.g., the resultant value of the training procedure) may be compared to a reference value stored at the reference value storage 235 to determine if a change to the training procedure is detected. For example, if the determined value of VREF is different than the reference value (e.g., beyond a margin of error), the host device 205, the memory device 210, or both may determine that the training procedure has changed (e.g., based on a change to the channel between the host device 205 and the memory device 210), potentially indicating that an attack has occurred on the memory device 210.

The host device 205 or memory device 210 may determine the reference value for comparison based on one or more current operating conditions of the host device 205, the memory device 210, or both. For example, the host device 205, the memory device 210, or both may perform one or more measurements prior to or during the training procedure. For example, the host device 205, the memory device 210, or both may measure one or more parameters of the DRAM component 215 (e.g., a voltage, a speed), one or more parameters of the channel between the host device 205 and the memory device 210, or a combination thereof. Additionally or alternatively, the host device 205 may receive one or more measurements (e.g., metrics) from one or more external sensors (e.g., temperature sensors). The host device 205, the memory device 210, or both may use a most-recent metric (or a set of most-recent metrics) as a "current" metric for a training procedure. That is, the current metric may correspond to a measurement determined by the host device 205 within a time threshold, an average of one or more measurements determined by the host device 205 within a time threshold (e.g., with outliers removed), a measurement triggered by performing the training procedure, or any combination thereof. In some examples, the current metric for the channel that is between the host device 205 and the memory device 210 may be based on a current voltage of the DRAM component 215, a current speed of the DRAM component 215, a current temperature associated with the channel between the host device 205 and the memory device 210, or any combination of these or other measurements that may be performed or received by the host device 205, the memory device 210, or both.

The host device 205 or memory device 210 may use one or more current metrics to select a reference value for comparison from a reference value storage 235. As described herein, each reference value corresponds to respective operating conditions (e.g., metrics) at which the training procedure was performed in order to obtain the reference value. The host device 205 or memory device 210 may determine the one or more operating conditions corresponding to a stored reference value and closest to the one or more current metrics. For example, if the current metric is a temperature value (e.g., 40.2° C.), the host device 205 or memory device may determine a reference value associated with a temperature data point (e.g., 40° C.) that is closest to the current temperature value and may use the determined reference value for the comparison. In this way, the host device 205 may compare the result of a training procedure with a previous result of the training procedure at relatively similar operating conditions to determine if the training procedure has changed.

In some cases, if the resultant value of the current training procedure (e.g., a VREF value) is within a range (e.g., a pre-determined margin) from the reference value for comparison, the host device 205 may determine that the training procedure has not changed. Accordingly, the host device 205 may predict that no attack or tampering with the DRAM component 215 has occurred. In other cases, if the resultant value of the current training procedure is outside of the range from the reference value for comparison, the host device 205 may determine that that the training procedure has changed and, in some examples, may predict that an attack on the DRAM component 215 has occurred. In some cases, the range may be pre-configured at the host device 205 or the memory device 210. In some other cases, the range may be tunable, for example, based on one or more security metrics. Additionally or alternatively, the range may dynamically change based on one or more triggers (e.g., using a relatively smaller range if suspicious behavior is detected).

If a change to the training procedure is determined by the host device 205, the memory device 210, or both, the host device 205, the memory device 210, or both may take corrective action. For example, the host device 205 may disable one or more features of the memory device 210 based on or in response to the variation from the expected training procedure. By taking corrective action, such as disabling the one or more features, the memory device 210 may effectively lock or limit specific functionality to protect secure information against attack (e.g., by refraining from using security keys, locking access to specific data, refraining from communicating specific data, or otherwise locking functionality that involves potential security risks). Additionally or alternatively, the host device 205 may transmit a notification (e.g., signaling indicative of the determined change to the training procedure) to an OEM or other device based on the comparison. In some examples, the host device 205 may transmit signaling to the DRAM component 215 requesting identification information from the DRAM component 215 based on the comparison (e.g., to determine if the DRAM component 215 has been removed and replaced).

In one example, the host device 205 may perform training, such as VREF training to determine a value, such as a VREF value, for signaling with the DRAM component 215, where the VREF is a DRAM reference voltage for the command address (CA) input receiver. The host device 205 may tune the VREF value based on one or more results of the VREF training to adjust the data eye (e.g., to optimize data throughput on the channel that is between the host device 205 and the memory device 210). In order to perform VREF training, the host device 205 may send, for example, a command address test (CAT) pattern on the CA bus 220 to the DRAM component 215. The DRAM component 215 may include training circuitry 225 (e.g., a loop back mode) to facilitate sending the CAT pattern back to the host device 205 via the DQ channel 230. The host device 205 may determine one or more parameters for the channel between the host device 205 and the memory device 210 based on the training (e.g., using the information fed back on the DQ channel 230) and select a value of VREF based on the one or more parameters. For example, the host device 205 may sweep the VREF settings while sending the CAT pattern and may measure the resultant data eye (e.g., the return data eye over the DQ channel 230 for different VREF settings) until a specific (e.g., largest) data eye is achieved by the host device 205. In this way, the host device 205 may select a VREF setting for the channel based on the data eye for the fed back CAT pattern. In some cases, the host device 205 may perform VREF training at multiple set points upon booting up.

In an initial procedure (e.g., at an integrator), the host device 205 may perform the VREF training to determine and write a set of reference values (e.g., VREF settings) to a reference value storage 235 (e.g., a determined VREF setting for a selected data eye at different data points of voltage, speed, temperature, or other metrics). During operation in the field, the host device 205 may perform the VREF training to determine a VREF setting and compare the VREF setting to a most-relevant reference value based on one or more operating conditions. Such a training procedure may allow the host device 205 to apply the determined VREF setting, as well as detect whether the VREF training has changed.

Figure 3:
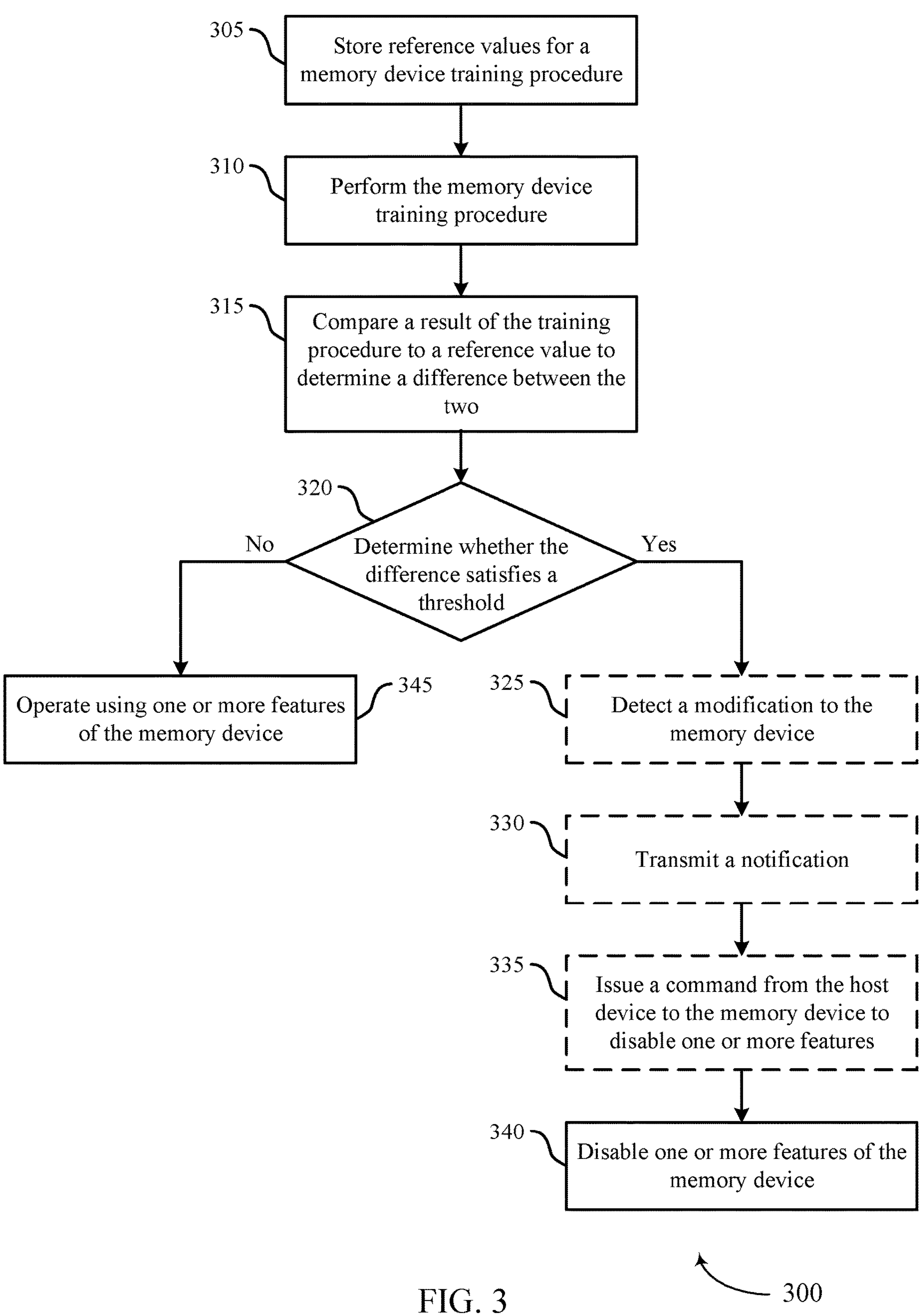
FIG. 3 illustrates an example of a process flow that supports training procedure change determination to detect an attack in accordance with examples as disclosed herein.

FIG. 3 illustrates an example of a process flow 300 that supports training procedure change determination to detect an attack in accordance with examples as disclosed herein. The process flow 300 may be performed by devices described with reference to FIGS. 1 and 2. For example, a host device—such as a host device 105 or a host device 205—may perform one or more aspects of the process flow 300, and a memory device—such as a memory device 110 or a memory device 210—may perform one or more other aspects of the process flow 300. The host device may be coupled with the memory device, and the host device and memory device may both be associated with (e.g., components of) a vehicle. The process flow 300 may support detection of a memory device attack based on training procedures between the host device and a DRAM component such as the DRAM component 215 described with reference to FIG. 2. Alternative examples of the following may be implemented, where some steps are performed in a different order or not at all. Additionally, some steps may include additional features not mentioned below.

Aspects of the process flow 300 may be implemented by a controller, among other components (e.g., a host device controller, an external memory controller, a memory device controller, or some combination thereof). Additionally or alternatively, aspects of the process flow 300 may be implemented by logic coupled with a host device or a memory device. For example, the logic may be operable to cause an apparatus to perform the operations of the process flow 300.

At 305, the host device may issue or write (or cause to be written) reference values to a non-volatile memory. For example, the host device and memory device may perform multiple training procedures at different operating conditions prior to operation in the field to determine a set of reference values for different data points (e.g., operating conditions, such as temperature, DRAM speed, DRAM voltage). These reference values may be stored for comparison to later trainings. The reference values may be determined as described with reference to FIG. 2 and the non-volatile memory may include reference value storage as described with reference to FIG. 2. For example, the host device may write the reference values to non-volatile memory at the host device, at the memory device (e.g., external to a DRAM component), at another memory device external to the memory device including the DRAM component), or any combination thereof, such that the reference values may be accessible when performing trainings in the field.

At 310, the host device and the memory device (e.g., the DRAM component of the memory device) may perform a training procedure as described with reference to FIG. 2. In some cases, the training may be based on a current metric (e.g., temperature of the channel or another relatively recent measurement or setting for the channel or DRAM component) as described with reference to FIG. 2. The training may be triggered by an event, for example, as part of a procedure for booting up the memory device or to monitor the health of the memory device, among other examples.

At 315, the host device or the memory device may compare the result of the current training procedure to a reference value in order to determine a difference between the two values. In some cases, the reference value may correspond to a current metric (e.g., the current temperature of the channel at the time of the training) as described with reference to FIG. 2. For example, the host device or memory device may select the reference value for comparison from a set of stored reference values based on the current metric for the current training corresponding to (e.g., being closest to) a metric for operation when the reference value was determined.

At 320, the host device may determine whether the difference between the result of the training and the reference value satisfies a threshold. For example, the host device may determine whether an absolute value of the difference is greater than or less than the threshold (e.g., a margin of error from the reference value). Additionally or alternatively, the host device may determine whether the result of the training falls within or outside a threshold range around the reference value.

In some cases, at 325, the host device may determine that the difference satisfies the threshold (e.g., is greater than the threshold). If the difference satisfies the threshold (e.g., a change in the training procedure is determined), the host device may detect a modification to the memory device. In some cases, such a modification to the memory device may indicate an attack on the memory device as described with reference to FIG. 2.

At 330, in some cases, based on determining that the difference satisfies the threshold, the host device may transmit a notification. In some cases, the host device may transmit the notification to an OEM, a user device, or both. For example, the notification may indicate that there has been a possible attack on the memory device.

In some cases, at 335, the host device may issue a command to the memory device to disable one or more features. For example, if the training is performed as part of a boot up procedure, the host device may issue a command to stop the boot up procedure in order to protect secure information from the attack. In another example, the host device may issue a command to initiate a locking feature of the memory device which may inhibit the attacker from obtaining secure information.

At 340, based on determining that the difference between the training value (e.g., the resultant value of the current training procedure) and the reference value satisfies the threshold, the host device may disable one or more features of the memory device. For example, the host device may initiate a locking feature of the memory device or take other actions against the attack. The memory device may refrain from performing specific functions (e.g., accessing some data, generating or using some keys) to mitigate the potential attack on the memory device, the DRAM component, or both.

If the host device determines that the difference between the training value and the reference value fails to satisfy the threshold (e.g., the difference is less than the threshold value), at 345, the host device may determine that there has been no attack on the memory device and may operate according to a first mode (e.g., a default mode, a normal operation mode), such as using one or more features of the memory device that may rely on or access secure information. At 345, the host device may predict that there has been no attack on the DRAM component or the memory device, determining that information pertaining to the DRAM component may be secure and available for use by the host device.

Figure 4:
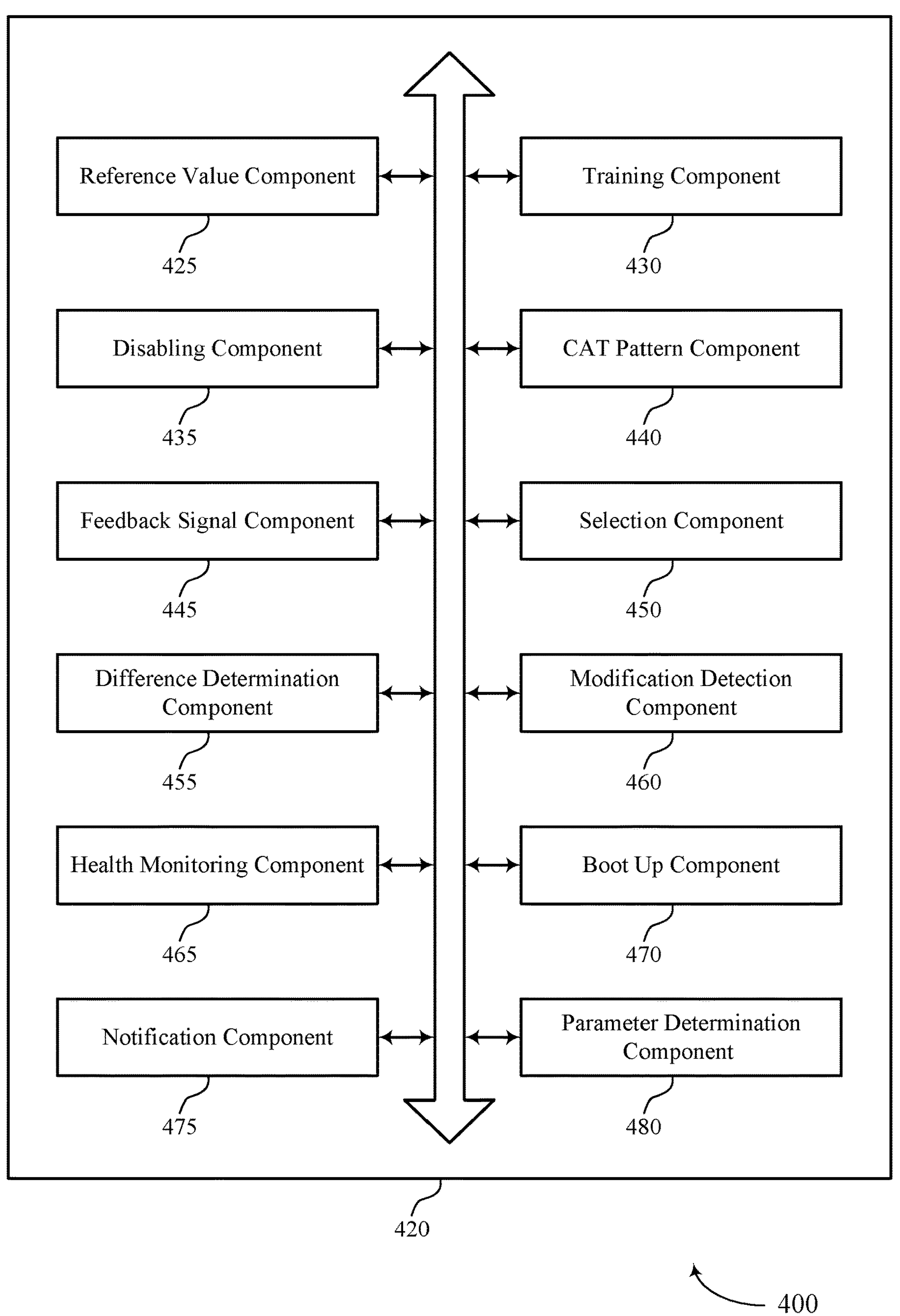
FIG. 4 shows a block diagram of a host device that supports training procedure change determination to detect an attack in accordance with examples as disclosed herein.

FIG. 4 shows a block diagram 400 of a host device 420 that supports training procedure change determination to detect an attack in accordance with examples as disclosed herein. The host device 420 may be an example of aspects of a host device as described with reference to FIGS. 1 through 3. The host device 420, or various components thereof, may be an example of means for performing various aspects of training procedure change determination to detect an attack as described herein. For example, the host device 420 may include a reference value component 425, a training component 430, a disabling component 435, a CAT pattern component 440, a feedback signal component 445, a selection component 450, a difference determination component 455, a modification detection component 460, a health monitoring component 465, a boot up component 470, a notification component 475, a parameter determination component 480, or any combination thereof. Each of these components may communicate, directly or indirectly, with one another (e.g., via one or more buses).

The reference value component 425 may be configured as or otherwise support a means for writing, to non-volatile memory at a host device, a plurality of reference values associated with a procedure for training a memory device. The training component 430 may be configured as or otherwise support a means for performing the procedure for training the memory device based at least in part on a current metric for a channel that is between the host device and the memory device. The disabling component 435 may be configured as or otherwise support a means for disabling one or more features of the memory device based at least in part on a result of the procedure for training the memory device and a reference value of the plurality of reference values corresponding to the current metric for the channel.

In some examples, the training component 430 may be configured as or otherwise support a means for performing a plurality of procedures for training the memory device and corresponding to a plurality of respective temperatures, where the plurality of reference values are based at least in part on the plurality of procedures for training the memory device, and where the current metric is a current temperature.

In some examples, the training component 430 may be configured as or otherwise support a means for performing a plurality of procedures for training the memory device based at least in part on a plurality of voltages of a DRAM component of the memory device, a plurality of speeds of the DRAM component of the memory device, or a plurality of temperatures associated with the channel, or any combination thereof, where the plurality of reference values are based at least in part on the plurality of procedures for training the memory device, and where the current metric is a current voltage of the DRAM component of the memory device, a current speed of the DRAM component of the memory device, or a current temperature associated with the channel, or any combination thereof.

In some examples, the CAT pattern component 440 may be configured as or otherwise support a means for transmitting, to the memory device, first signaling indicative of a CAT pattern. In some examples, the feedback signal component 445 may be configured as or otherwise support a means for receiving, from the memory device, second signaling including feedback in response to the first signaling. In some examples, the selection component 450 may be configured as or otherwise support a means for selecting a VREF value for the channel that is between the host device and the memory device based at least in part on the second signaling, where the procedure for training the memory device includes the transmitting, the receiving, and the selecting, and where the result of the procedure for training the memory device includes the VREF value. In some examples, the parameter determination component 480 may be configured as or otherwise support a means for determining one or more parameters for the channel based at least in part on the second signaling, where the VREF value is selected based at least in part on the one or more parameters. In some examples, the first signaling is transmitted on a CA bus. In some examples, the second signaling is received on a data bus.

In some examples, the difference determination component 455 may be configured as or otherwise support a means for determining that a difference between the result of the procedure for training the memory device and the reference value satisfies a threshold difference, where disabling the one or more features of the memory device is based at least in part on determining the difference satisfies the threshold difference.

In some examples, the procedure for training the memory device includes a procedure for aligning a clock of the memory device.

In some examples, the modification detection component 460 may be configured as or otherwise support a means for detecting a modification to the memory device based at least in part on comparing the result of the procedure for training the memory device to the reference value, where disabling the one or more features of the memory device is based at least in part on detecting the modification to the memory device. In some examples, the modification to the memory device includes adding an interposer to the memory device, adding cabling to the memory device, adding a socket to the memory device, or removing a DRAM component from the memory device, or any combination thereof.

In some examples, the health monitoring component 465 may be configured as or otherwise support a means for monitoring a health of the memory device, where performing the procedure for training the memory device is based at least in part on monitoring the health of the memory device.

In some examples, the boot up component 470 may be configured as or otherwise support a means for performing a procedure for booting up the memory device, where performing the procedure for training the memory device is based at least in part on performing the procedure for booting up the memory device.

In some examples, the boot up component 470 may be configured as or otherwise support a means for stopping the procedure for booting up the memory device based at least in part on comparing the result of the procedure for training the memory device to the reference value. In some examples, the boot up component 470 may be configured as or otherwise support a means for refraining from communicating secure information with the memory device based at least in part on stopping the procedure for booting up the memory device.

In some examples, the notification component 475 may be configured as or otherwise support a means for transmitting signaling indicative of a notification to an OEM, or a user device, or any combination thereof based at least in part on comparing the result of the procedure for training the memory device to the reference value.

In some examples, the disabling component 435 may be configured as or otherwise support a means for transmitting signaling indicative of a command to the memory device based at least in part on comparing the result of the procedure for training the memory device to the reference value. In some examples, the disabling component 435 may be configured as or otherwise support a means for initiating a locking of a feature of the memory device based at least in part on the command, where the disabling is based at least in part on initiating the locking of the feature.

In some examples, the plurality of reference values includes a plurality of VREF values for the memory device.

Figure 5:
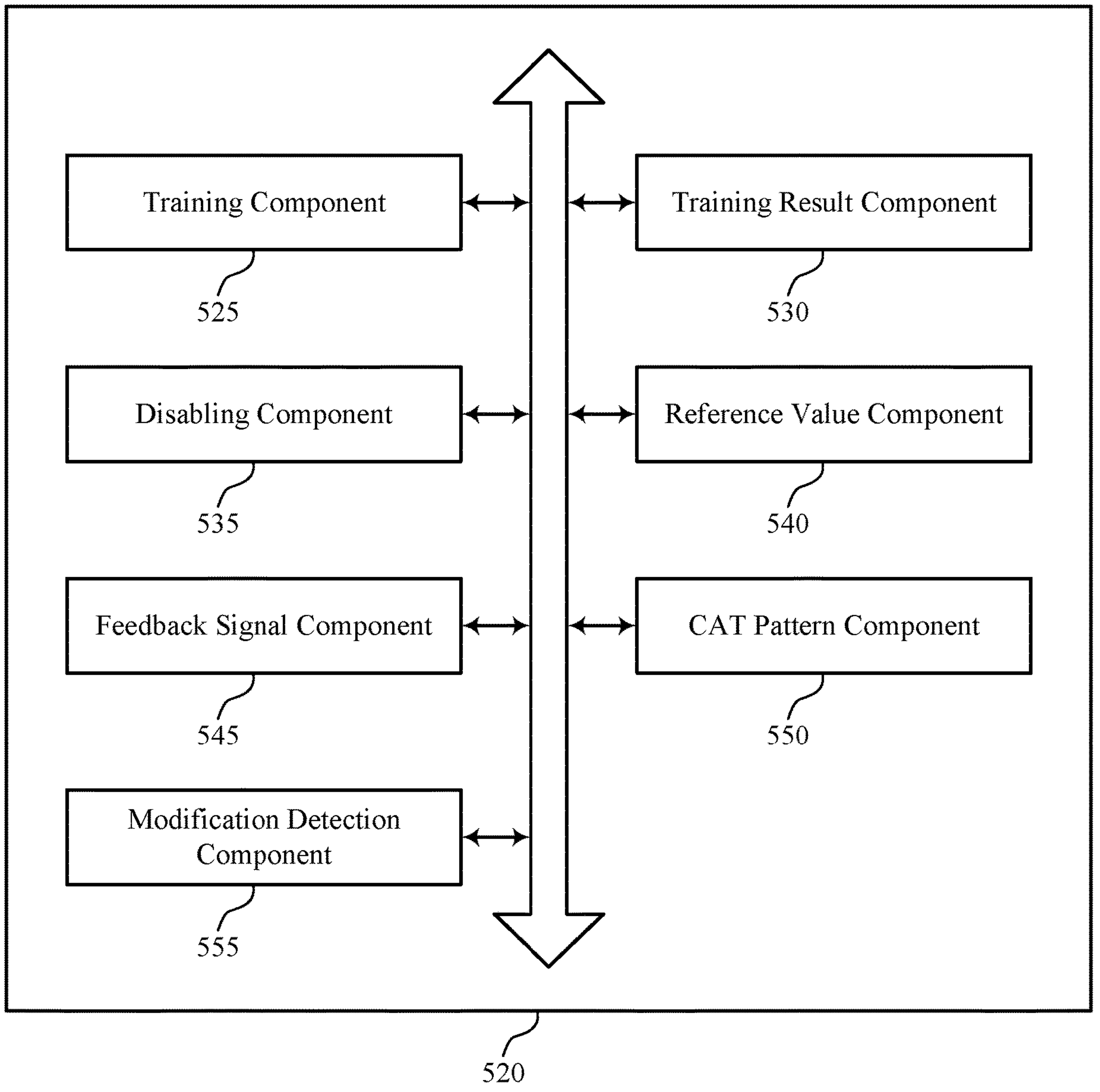
FIG. 5 shows a block diagram of a memory device that supports training procedure change determination to detect an attack in accordance with examples as disclosed herein.

FIG. 5 shows a block diagram 500 of a memory device 520 that supports training procedure change determination to detect an attack in accordance with examples as disclosed herein. The memory device 520 may be an example of aspects of a memory device as described with reference to FIGS. 1 through 3. The memory device 520, or various components thereof, may be an example of means for performing various aspects of training procedure change determination to detect an attack as described herein. For example, the memory device 520 may include a training component 525, a training result component 530, a disabling component 535, a reference value component 540, a feedback signal component 545, a CAT pattern component 550, a modification detection component 555, or any combination thereof. Each of these components may communicate, directly or indirectly, with one another (e.g., via one or more buses).

The training component 525 may be configured as or otherwise support a means for performing a procedure for training a memory device based at least in part on a current metric for a channel that is between the memory device and a host device. The training result component 530 may be configured as or otherwise support a means for receiving, at the memory device and from the host device, signaling indicative of a command based at least in part on a result of the procedure for training the memory device. The disabling component 535 may be configured as or otherwise support a means for disabling one or more features of the memory device based at least in part on the command.

In some examples, the CAT pattern component 550 may be configured as or otherwise support a means for receiving, from the host device, second signaling indicative of a CAT pattern. In some examples, the feedback signal component 545 may be configured as or otherwise support a means for transmitting, to the host device, third signaling including feedback for the second signaling, where the procedure for training the memory device includes receiving the second signaling and transmitting the third signaling, and where the result of the procedure for training the memory device is based at least in part on the third signaling. In some examples, the second signaling is received on a CA bus. In some examples, the third signaling is transmitted on a data bus.

In some examples, the procedure for training the memory device includes a procedure for aligning a clock of the memory device.

In some examples, the modification detection component 555 may be configured as or otherwise support a means for detecting a modification to the memory device based at least in part on the command, where disabling the one or more features of the memory device is based at least in part on detecting the modification to the memory device. In some examples, the modification to the memory device includes adding an interposer to the memory device, adding cabling to the memory device, adding a socket to the memory device, or removing a DRAM component from the memory device, or any combination thereof.

In some examples, the disabling component 535 may be configured as or otherwise support a means for initiating a locking of a feature of the memory device based at least in part on the command, where the disabling is based at least in part on initiating the locking of the feature.

The reference value component 540 may be configured as or otherwise support a means for writing, to non-volatile memory at a memory device, a plurality of reference values associated with a procedure for training a DRAM component of the memory device. In some examples, the training result component 530 may be configured as or otherwise support a means for receiving, from a host device, first signaling indicative of a result of the procedure for training the DRAM component of the memory device based at least in part on a current metric for a channel that is between the host device and the DRAM component of the memory device. The feedback signal component 545 may be configured as or otherwise support a means for transmitting, to the host device, second signaling indicative of a change to the channel that is between the host device and the DRAM component of the memory device based at least in part on the result of the procedure for training the DRAM component of the memory device and a reference value of the plurality of reference values corresponding to the current metric for the channel.

In some examples, the reference value component 540 may be configured as or otherwise support a means for receiving, from the host device, third signaling indicative of the plurality of reference values based at least in part on a plurality of procedures for training the DRAM component of the memory device, where writing the plurality of reference values to the non-volatile memory at the memory device is based at least in part on the third signaling.

In some examples, the disabling component 535 may be configured as or otherwise support a means for disabling one or more features of the DRAM component of the memory device based at least in part on the change to the channel that is between the host device and the DRAM component of the memory device.

In some examples, the plurality of reference values are written to the non-volatile memory external to the DRAM component of the memory device.

Figure 6:
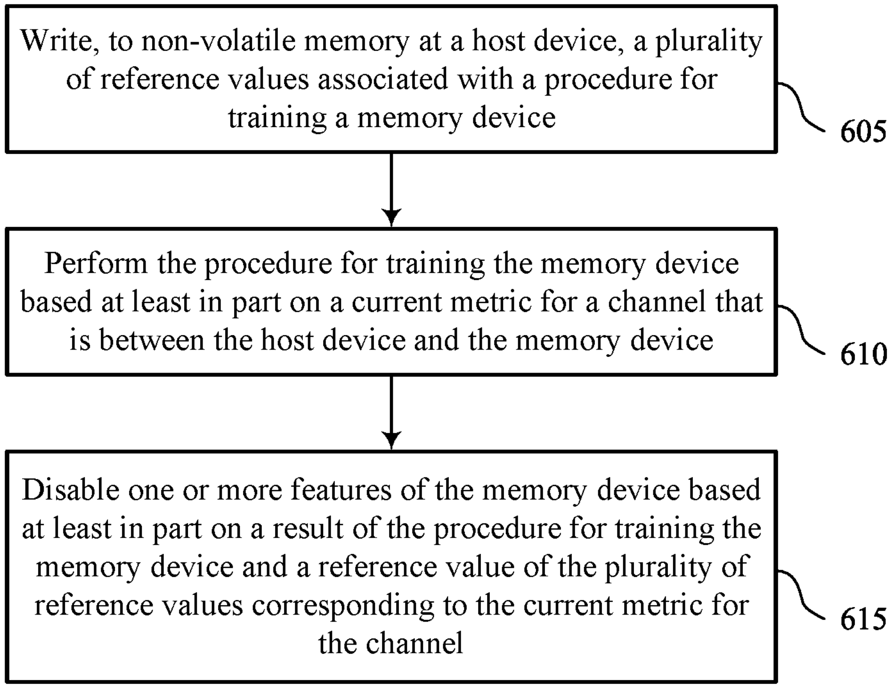
FIGS. 6 through 8 show flowcharts illustrating methods that support training procedure change determination to detect an attack in accordance with examples as disclosed herein.

FIG. 6 shows a flowchart illustrating a method 600 that supports training procedure change determination to detect an attack in accordance with examples as disclosed herein. The operations of method 600 may be implemented by a host device or its components as described herein. For example, the operations of method 600 may be performed by a host device as described with reference to FIGS. 1 through 4. In some examples, a host device may execute a set of instructions to control the functional elements of the device to perform the described functions. Additionally or alternatively, the host device may perform aspects of the described functions using special-purpose hardware.

At 605, the method may include writing, to non-volatile memory at a host device, a plurality of reference values associated with a procedure for training a memory device. The operations of 605 may be performed in accordance with examples as disclosed herein. In some examples, aspects of the operations of 605 may be performed by a reference value component 425 as described with reference to FIG. 4.

At 610, the method may include performing the procedure for training the memory device based at least in part on a current metric for a channel that is between the host device and the memory device. The operations of 610 may be performed in accordance with examples as disclosed herein. In some examples, aspects of the operations of 610 may be performed by a training component 430 as described with reference to FIG. 4.

At 615, the method may include disabling one or more features of the memory device based at least in part on a result of the procedure for training the memory device and a reference value of the plurality of reference values corresponding to the current metric for the channel. The operations of 615 may be performed in accordance with examples as disclosed herein. In some examples, aspects of the operations of 615 may be performed by a disabling component 435 as described with reference to FIG. 4.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: The apparatus, including features, circuitry, logic, means, or instructions, or any combination thereof for writing, to non-volatile memory at a host device, a plurality of reference values associated with a procedure for training a memory device; performing the procedure for training the memory device based at least in part on a current metric for a channel that is between the host device and the memory device; and disabling one or more features of the memory device based at least in part on a result of the procedure for training the memory device and a reference value of the plurality of reference values corresponding to the current metric for the channel.

Aspect 2: The apparatus of aspect 1, further including operations, features, circuitry, logic, means, or instructions, or any combination thereof for performing a plurality of procedures for training the memory device and corresponding to a plurality of respective temperatures, where the plurality of reference values are based at least in part on the plurality of procedures for training the memory device, and where the current metric is a current temperature.

Aspect 3: The apparatus of any of aspects 1 through 2, further including operations, features, circuitry, logic, means, or instructions, or any combination thereof for performing a plurality of procedures for training the memory device based at least in part on a plurality of voltages of a DRAM component of the memory device, a plurality of speeds of the DRAM component of the memory device, or a plurality of temperatures associated with the channel, or any combination thereof, where the plurality of reference values are based at least in part on the plurality of procedures for training the memory device, and where the current metric is a current voltage of the DRAM component of the memory device, a current speed of the DRAM component of the memory device, or a current temperature associated with the channel, or any combination thereof.

Aspect 4: The apparatus of any of aspects 1 through 3, further including operations, features, circuitry, logic, means, or instructions, or any combination thereof for transmitting, to the memory device, first signaling indicative of a CAT pattern; receiving, from the memory device, second signaling including feedback in response to the first signaling; and selecting a VREF value for the channel that is between the host device and the memory device based at least in part on the second signaling, where the procedure for training the memory device includes the transmitting, the receiving, and the selecting, and where the result of the procedure for training the memory device includes the VREF value.

Aspect 5: The apparatus of aspect 4, further including operations, features, circuitry, logic, means, or instructions, or any combination thereof for determining one or more parameters for the channel based at least in part on the second signaling, where the VREF value is selected based at least in part on the one or more parameters.

Aspect 6: The apparatus of any of aspects 4 through 5, further including operations, features, circuitry, logic, means, or instructions, or any combination thereof for the first signaling is transmitted on a CA bus and the second signaling is received on a data bus.

Aspect 7: The apparatus of any of aspects 1 through 6, further including operations, features, circuitry, logic, means, or instructions, or any combination thereof for determining that a difference between the result of the procedure for training the memory device and the reference value satisfies a threshold difference, where disabling the one or more features of the memory device is based at least in part on determining the difference satisfies the threshold difference.

Aspect 8: The apparatus of any of aspects 1 through 7, further including operations, features, circuitry, logic, means, or instructions, or any combination thereof for the procedure for training the memory device includes a procedure for aligning a clock of the memory device.

Aspect 9: The apparatus of any of aspects 1 through 8, further including operations, features, circuitry, logic, means, or instructions, or any combination thereof for detecting a modification to the memory device based at least in part on comparing the result of the procedure for training the memory device to the reference value, where disabling the one or more features of the memory device is based at least in part on detecting the modification to the memory device.

Aspect 10: The apparatus of aspect 9, further including operations, features, circuitry, logic, means, or instructions, or any combination thereof for the modification to the memory device includes adding an interposer to the memory device, adding cabling to the memory device, adding a socket to the memory device, or removing a DRAM component from the memory device, or any combination thereof.

Aspect 11: The apparatus of any of aspects 1 through 10, further including operations, features, circuitry, logic, means, or instructions, or any combination thereof for monitoring a health of the memory device, where performing the procedure for training the memory device is based at least in part on monitoring the health of the memory device.

Aspect 12: The apparatus of any of aspects 1 through 11, further including operations, features, circuitry, logic, means, or instructions, or any combination thereof for performing a procedure for booting up the memory device, where performing the procedure for training the memory device is based at least in part on performing the procedure for booting up the memory device.

Aspect 13: The apparatus of aspect 12, further including operations, features, circuitry, logic, means, or instructions, or any combination thereof for stopping the procedure for booting up the memory device based at least in part on comparing the result of the procedure for training the memory device to the reference value and refraining from communicating secure information with the memory device based at least in part on stopping the procedure for booting up the memory device.

Aspect 14: The apparatus of any of aspects 1 through 13, further including operations, features, circuitry, logic, means, or instructions, or any combination thereof for transmitting signaling indicative of a notification to an OEM, or a user device, or any combination thereof based at least in part on comparing the result of the procedure for training the memory device to the reference value.

Aspect 15: The apparatus of any of aspects 1 through 14, further including operations, features, circuitry, logic, means, or instructions, or any combination thereof for transmitting signaling indicative of a command to the memory device based at least in part on comparing the result of the procedure for training the memory device to the reference value and initiating a locking of a feature of the memory device based at least in part on the command, where the disabling is based at least in part on initiating the locking of the feature.

Aspect 16: The apparatus of any of aspects 1 through 15, further including operations, features, circuitry, logic, means, or instructions, or any combination thereof for the plurality of reference values includes a plurality of VREF values for the memory device.

Figure 7:
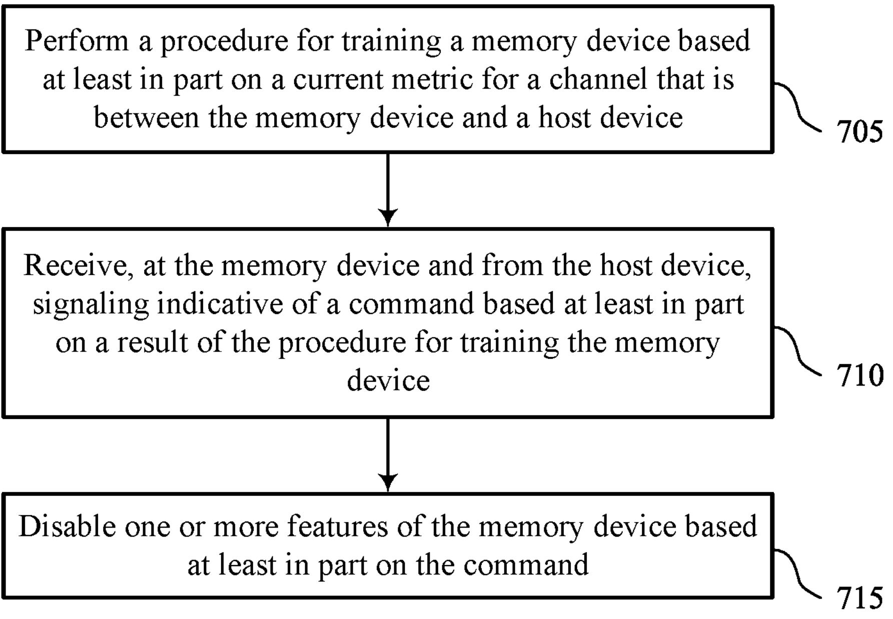

FIG. 7 shows a flowchart illustrating a method 700 that supports training procedure change determination to detect an attack in accordance with examples as disclosed herein. The operations of method 700 may be implemented by a memory device or its components as described herein. For example, the operations of method 700 may be performed by a memory device as described with reference to FIGS. 1 through 3 and 5. In some examples, a memory device may execute a set of instructions to control the functional elements of the device to perform the described functions. Additionally or alternatively, the memory device may perform aspects of the described functions using special-purpose hardware.

At 705, the method may include performing a procedure for training a memory device based at least in part on a current metric for a channel that is between the memory device and a host device. The operations of 705 may be performed in accordance with examples as disclosed herein. In some examples, aspects of the operations of 705 may be performed by a training component 525 as described with reference to FIG. 5.

At 710, the method may include receiving, at the memory device and from the host device, signaling indicative of a command based at least in part on a result of the procedure for training the memory device. The operations of 710 may be performed in accordance with examples as disclosed herein. In some examples, aspects of the operations of 710 may be performed by a training result component 530 as described with reference to FIG. 5.

At 715, the method may include disabling one or more features of the memory device based at least in part on the command. The operations of 715 may be performed in accordance with examples as disclosed herein. In some examples, aspects of the operations of 715 may be performed by a disabling component 535 as described with reference to FIG. 5.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 17: The apparatus, including features, circuitry, logic, means, or instructions, or any combination thereof for performing a procedure for training a memory device based at least in part on a current metric for a channel that is between the memory device and a host device; receiving, at the memory device and from the host device, signaling indicative of a command based at least in part on a result of the procedure for training the memory device; and disabling one or more features of the memory device based at least in part on the command.

Aspect 18: The apparatus of aspect 17, further including operations, features, circuitry, logic, means, or instructions, or any combination thereof for receiving, from the host device, second signaling indicative of a CAT pattern and transmitting, to the host device, third signaling including feedback for the second signaling, where the procedure for training the memory device includes receiving the second signaling and transmitting the third signaling, and where the result of the procedure for training the memory device is based at least in part on the third signaling.

Aspect 19: The apparatus of aspect 18, further including operations, features, circuitry, logic, means, or instructions, or any combination thereof for the second signaling is received on a CA bus and the third signaling is transmitted on a data bus.

Aspect 20: The apparatus of any of aspects 17 through 19, further including operations, features, circuitry, logic, means, or instructions, or any combination thereof for the procedure for training the memory device includes a procedure for aligning a clock of the memory device.

Aspect 21: The apparatus of any of aspects 17 through 20, further including operations, features, circuitry, logic, means, or instructions, or any combination thereof for detecting a modification to the memory device based at least in part on the command, where disabling the one or more features of the memory device is based at least in part on detecting the modification to the memory device.

Aspect 22: The apparatus of aspect 21, further including operations, features, circuitry, logic, means, or instructions, or any combination thereof for the modification to the memory device includes adding an interposer to the memory device, adding cabling to the memory device, adding a socket to the memory device, or removing a DRAM component from the memory device, or any combination thereof.

Aspect 23: The apparatus of any of aspects 17 through 22, further including operations, features, circuitry, logic, means, or instructions, or any combination thereof for initiating a locking of a feature of the memory device based at least in part on the command, where the disabling is based at least in part on initiating the locking of the feature.

Figure 8:
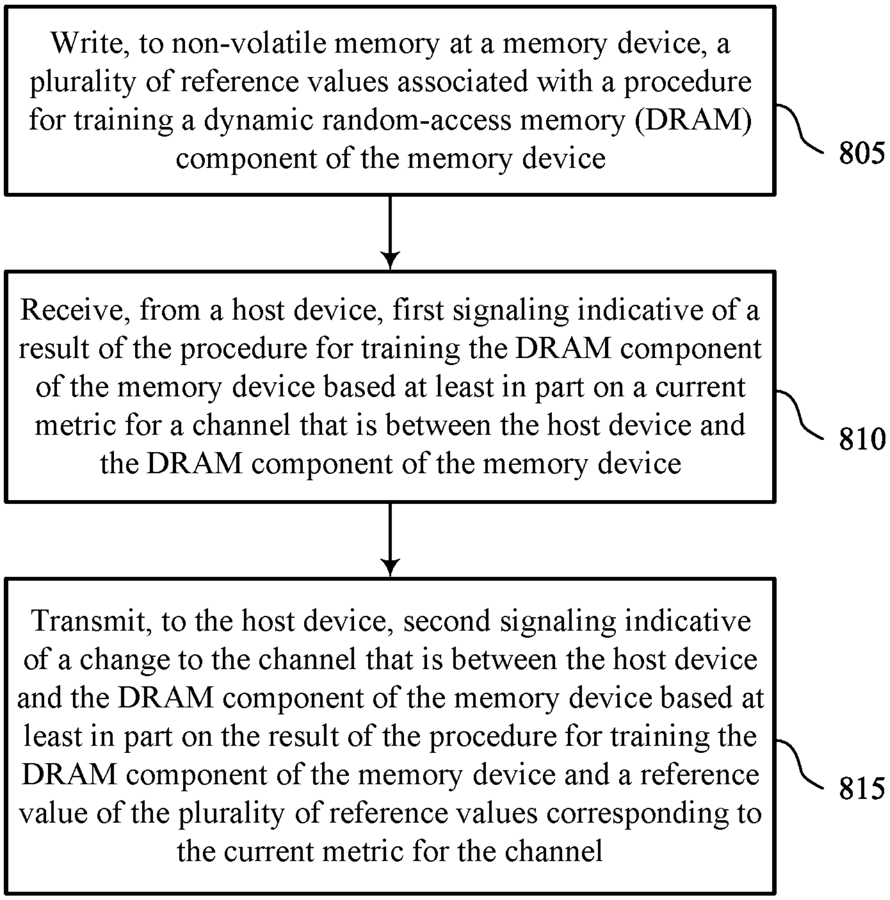

FIG. 8 shows a flowchart illustrating a method 800 that supports training procedure change determination to detect an attack in accordance with examples as disclosed herein. The operations of method 800 may be implemented by a memory device or its components as described herein. For example, the operations of method 800 may be performed by a memory device as described with reference to FIGS. 1 through 3 and 5. In some examples, a memory device may execute a set of instructions to control the functional elements of the device to perform the described functions. Additionally or alternatively, the memory device may perform aspects of the described functions using special-purpose hardware.

At 805, the method may include writing, to non-volatile memory at a memory device, a plurality of reference values associated with a procedure for training a DRAM component of the memory device. The operations of 805 may be performed in accordance with examples as disclosed herein. In some examples, aspects of the operations of 805 may be performed by a reference value component 540 as described with reference to FIG. 5.

At 810, the method may include receiving, from a host device, first signaling indicative of a result of the procedure for training the DRAM component of the memory device based at least in part on a current metric for a channel that is between the host device and the DRAM component of the memory device. The operations of 810 may be performed in accordance with examples as disclosed herein. In some examples, aspects of the operations of 810 may be performed by a training result component 530 as described with reference to FIG. 5.

At 815, the method may include transmitting, to the host device, second signaling indicative of a change to the channel that is between the host device and the DRAM component of the memory device based at least in part on the result of the procedure for training the DRAM component of the memory device and a reference value of the plurality of reference values corresponding to the current metric for the channel. The operations of 815 may be performed in accordance with examples as disclosed herein. In some examples, aspects of the operations of 815 may be performed by a feedback signal component 545 as described with reference to FIG. 5.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 24: The apparatus, including features, circuitry, logic, means, or instructions, or any combination thereof for writing, to non-volatile memory at a memory device, a plurality of reference values associated with a procedure for training a DRAM component of the memory device; receiving, from a host device, first signaling indicative of a result of the procedure for training the DRAM component of the memory device based at least in part on a current metric for a channel that is between the host device and the DRAM component of the memory device; and transmitting, to the host device, second signaling indicative of a change to the channel that is between the host device and the DRAM component of the memory device based at least in part on the result of the procedure for training the DRAM component of the memory device and a reference value of the plurality of reference values corresponding to the current metric for the channel.

Aspect 25: The apparatus of aspect 24, further including operations, features, circuitry, logic, means, or instructions, or any combination thereof for receiving, from the host device, third signaling indicative of the plurality of reference values based at least in part on a plurality of procedures for training the DRAM component of the memory device, where writing the plurality of reference values to the non-volatile memory at the memory device is based at least in part on the third signaling.

Aspect 26: The apparatus of any of aspects 24 through 25, further including operations, features, circuitry, logic, means, or instructions, or any combination thereof for disabling one or more features of the DRAM component of the memory device based at least in part on the change to the channel that is between the host device and the DRAM component of the memory device.

Aspect 27: The apparatus of any of aspects 24 through 26, further including operations, features, circuitry, logic, means, or instructions, or any combination thereof for the plurality of reference values are written to the non-volatile memory external to the DRAM component of the memory device.

It should be noted that the methods described herein describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 28: An apparatus, including: a host device; and logic coupled with the host device and operable to cause the apparatus to: write, to non-volatile memory at the host device, a plurality of reference values associated with a procedure for training a memory device; perform the procedure for training the memory device based at least in part on a current metric for a channel that is between the host device and the memory device; and disable one or more features of the memory device based at least in part on a result of the procedure for training the memory device and a reference value of the plurality of reference values corresponding to the current metric for the channel.

Aspect 29: The apparatus of aspect 28, where the logic is further operable to cause the apparatus to: perform a plurality of procedures for training the memory device and corresponding to a plurality of respective temperatures, where the plurality of reference values are based at least in part on the plurality of procedures for training the memory device, and where the current metric is a current temperature.

Aspect 30: The apparatus of any of aspects 28 through 29, where the logic is further operable to cause the apparatus to: perform a plurality of procedures for training the memory device based at least in part on a plurality of voltages of a DRAM component of the memory device, a plurality of speeds of the DRAM component of the memory device, or a plurality of temperatures associated with the channel, or any combination thereof, where the plurality of reference values are based at least in part on the plurality of procedures for training the memory device, and where the current metric is a current voltage of the DRAM component of the memory device, a current speed of the DRAM component of the memory device, or a current temperature associated with the channel, or any combination thereof.

Aspect 31: The apparatus of any of aspects 28 through 30, where the logic is further operable to cause the apparatus to: transmit, to the memory device, first signaling indicative of a CAT pattern; receive, from the memory device, second signaling including feedback in response to the first signaling; and select a VREF value for the channel that is between the host device and the memory device based at least in part on the second signaling, where the procedure for training the memory device includes the transmitting, the receiving, and the selecting, and where the result of the procedure for training the memory device includes the VREF value.

Aspect 32: The apparatus of any of aspects 28 through 31, where the logic is further operable to cause the apparatus to: determine a difference between the result of the procedure for training the memory device and the reference value satisfies a threshold difference, where disabling the one or more features of the memory device is based at least in part on determining the difference satisfies the threshold difference.

Aspect 33: The apparatus of any of aspects 28 through 32, where the procedure for training the memory device includes a procedure for aligning a clock of the memory device.

An apparatus is described. The following provides an overview of aspects of the apparatus as described herein:

Aspect 34: An apparatus, including: a memory device; and logic coupled with the memory device and operable to cause the apparatus to: perform a procedure for training the memory device based at least in part on a current metric for a channel that is between the memory device and a host device; receive, at the memory device and from the host device, signaling indicative of a command based at least in part on a result of the procedure for training the memory device; and disable one or more features of the memory device based at least in part on the command.

Aspect 35: The apparatus of aspect 34, where the logic is further operable to cause the apparatus to: receive, from the host device, second signaling indicative of a CAT pattern; and transmit, to the host device, third signaling including feedback for the second signaling, where the procedure for training the memory device includes receiving the second signaling and transmitting the third signaling, and where the result of the procedure for training the memory device is based at least in part on the third signaling.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms “electronic communication,” “conductive contact,” “connected,” and “coupled” may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term “coupling” refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term “isolated” refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

As used herein, the term "substantially" means that the modified characteristic (e.g., a verb or adjective modified by the term substantially) need not be absolute but is close enough to achieve the advantages of the characteristic.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or technologies such as infrared, radio, and microwave, then the coaxial cable, fiber optic cable, twisted pair, digital subscriber line (DSL), or technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:

performing a plurality of procedures for training a memory device;

writing, to non-volatile memory at a host device, a plurality of reference values associated with a procedure for training the memory device, wherein the plurality of reference values is based at least in part on the plurality of procedures for training the memory device, and wherein each reference value of the plurality of reference values corresponds to one or more respective operating conditions at which the plurality of procedures for training the memory device were performed;

performing, after writing the plurality of reference values, the procedure for training the memory device based at least in part on a current metric for a channel that is between the host device and the memory device; and disabling one or more features of the memory device based at least in part on a result of the procedure for training the memory device and a reference value of the plurality of reference values corresponding to the current metric for the channel.

2. The method of claim 1, further comprising:

performing the plurality of procedures for training the memory device and corresponding to a plurality of respective temperatures, wherein the current metric is a current temperature.

3. The method of claim 1, further comprising:

performing the plurality of procedures for training the memory device based at least in part on a plurality of voltages of a dynamic random-access memory (DRAM) component of the memory device, a plurality of speeds of the DRAM component of the memory device, or a plurality of temperatures associated with the channel, or any combination thereof, wherein the current metric is a current voltage of the DRAM component of the memory device, a current speed of the DRAM component of the memory device, or a current temperature associated with the channel, or any combination thereof.

4. The method of claim 1, further comprising:

transmitting, to the memory device, first signaling indicative of a command address test (CAT) pattern;

receiving, from the memory device, second signaling comprising feedback in response to the first signaling; and selecting a voltage reference (VREF) value for the channel that is between the host device and the memory device based at least in part on the second signaling, wherein the procedure for training the memory device comprises the transmitting, the receiving, and the selecting, and wherein the result of the procedure for training the memory device comprises the VREF value.

5. The method of claim 4, further comprising:

determining one or more parameters for the channel based at least in part on the second signaling, wherein the VREF value is selected based at least in part on the one or more parameters.

6. The method of claim 4, wherein:

the first signaling is transmitted on a command address (CA) bus; and the second signaling is received on a data bus.

7. A method, comprising:

writing, to non-volatile memory at a host device, a plurality of reference values associated with a first procedure for training a memory device, wherein each reference value of the plurality of reference values corresponds to one or more respective operating conditions at which the first procedure for training the memory device was performed;

performing a second procedure for training the memory device based at least in part on a current metric for a channel that is between the host device and the memory device;

determining that a difference between a result of the second procedure for training the memory device and a reference value of the plurality of reference values satisfies a threshold difference; and disabling one or more features of the memory device based at least in part on the result of the second procedure for training the memory device and the reference value corresponding to the current metric for the channel, and further based at least in part on determining the difference satisfies the threshold difference.

8. The method of claim 1, wherein the procedure for training the memory device comprises a procedure for aligning a clock of the memory device.

9. The method of claim 1, further comprising:

detecting a modification to the memory device based at least in part on comparing the result of the procedure for training the memory device to the reference value, wherein disabling the one or more features of the memory device is based at least in part on detecting the modification to the memory device.

10. The method of claim 9, wherein the modification to the memory device comprises adding an interposer to the memory device, adding cabling to the memory device, adding a socket to the memory device, or removing a dynamic random-access memory (DRAM) component from the memory device, or any combination thereof.

11. The method of claim 1, further comprising:

monitoring a health of the memory device, wherein performing the procedure for training the memory device is based at least in part on monitoring the health of the memory device.

12. The method of claim 1, further comprising:

performing a procedure for booting up the memory device, wherein performing the procedure for training the memory device is based at least in part on performing the procedure for booting up the memory device.

13. The method of claim 12, further comprising:

stopping the procedure for booting up the memory device based at least in part on comparing the result of the procedure for training the memory device to the reference value; and refraining from communicating secure information with the memory device based at least in part on stopping the procedure for booting up the memory device.

14. The method of claim 1, further comprising:

transmitting signaling indicative of a notification to an original equipment manufacturer (OEM), or a user device, or any combination thereof based at least in part on comparing the result of the procedure for training the memory device to the reference value.

15. The method of claim 1, further comprising:

transmitting signaling indicative of a command to the memory device based at least in part on comparing the result of the procedure for training the memory device to the reference value; and initiating a locking of a feature of the memory device based at least in part on the command, wherein the disabling is based at least in part on initiating the locking of the feature.

16. The method of claim 1, wherein the plurality of reference values comprises a plurality of voltage reference (VREF) values for the memory device.

17. A method, comprising:

performing a procedure for training a memory device based at least in part on a current metric for a channel that is between the memory device and a host device;

receiving, from the host device, first signaling indicative of a command address test (CAT) pattern;

transmitting, to the host device, second signaling comprising feedback for the first signaling;

receiving, at the memory device and from the host device, third signaling indicative of a command based at least in part on a result of the procedure for training the memory device, wherein the result of the procedure for training the memory device is based at least in part on the second signaling; and disabling one or more features of the memory device based at least in part on the command.

18. The method of claim 17, wherein the procedure for training the memory device comprises receiving the first signaling and transmitting the second signaling.

19. The method of claim 18, wherein:

the first signaling is received on a command address (CA) bus; and the second signaling is transmitted on a data bus.

20. The method of claim 17, wherein the procedure for training the memory device comprises a procedure for aligning a clock of the memory device.

21. The method of claim 17, further comprising:

detecting a modification to the memory device based at least in part on the command, wherein disabling the one or more features of the memory device is based at least in part on detecting the modification to the memory device.

22. The method of claim 21, wherein the modification to the memory device comprises adding an interposer to the memory device, adding cabling to the memory device, adding a socket to the memory device, or removing a dynamic random-access memory (DRAM) component from the memory device, or any combination thereof.

23. The method of claim 17, further comprising:

initiating a locking of a feature of the memory device based at least in part on the command, wherein the disabling is based at least in part on initiating the locking of the feature.

24. A method, comprising:

writing, to non-volatile memory at a memory device, a plurality of reference values associated with a procedure for training a dynamic random-access memory (DRAM) component of the memory device;

receiving, from a host device, first signaling indicative of a result of the procedure for training the DRAM component of the memory device based at least in part on a current metric for a channel that is between the host device and the DRAM component of the memory device; and transmitting, to the host device, second signaling indicative of a change to the channel that is between the host device and the DRAM component of the memory device based at least in part on the result of the procedure for training the DRAM component of the memory device and a reference value of the plurality of reference values corresponding to the current metric for the channel.

25. The method of claim 24, further comprising:

receiving, from the host device, third signaling indicative of the plurality of reference values based at least in part on a plurality of procedures for training the DRAM component of the memory device, wherein writing the plurality of reference values to the non-volatile memory at the memory device is based at least in part on the third signaling.

26. The method of claim 24, further comprising:

disabling one or more features of the DRAM component of the memory device based at least in part on the change to the channel that is between the host device and the DRAM component of the memory device.

27. The method of claim 24, wherein the plurality of reference values are written to the non-volatile memory external to the DRAM component of the memory device.

28. An apparatus, comprising:

a host device; and logic coupled with the host device and operable to cause the apparatus to:

perform a plurality of procedures for training a memory device;

write, to non-volatile memory at the host device, a plurality of reference values associated with a procedure for training the memory device, wherein the plurality of reference values is based at least in part on the plurality of procedures for training the memory device, and wherein each reference value of the plurality of reference values corresponds to one or more respective operating conditions at which the plurality of procedures for training the memory device were performed;

perform, after writing the plurality of reference values, the procedure for training the memory device based at least in part on a current metric for a channel that is between the host device and the memory device; and disable one or more features of the memory device based at least in part on a result of the procedure for training the memory device and a reference value of the plurality of reference values corresponding to the current metric for the channel.

29. The apparatus of claim 28, wherein the logic is further operable to cause the apparatus to:

perform the plurality of procedures for training the memory device and corresponding to a plurality of respective temperatures, wherein the current metric is a current temperature.

30. The apparatus of claim 28, wherein the logic is further operable to cause the apparatus to:

perform the plurality of procedures for training the memory device based at least in part on a plurality of voltages of a dynamic random-access memory (DRAM) component of the memory device, a plurality of speeds of the DRAM component of the memory device, or a plurality of temperatures associated with the channel, or any combination thereof, wherein the current metric is a current voltage of the DRAM component of the memory device, a current speed of the DRAM component of the memory device, or a current temperature associated with the channel, or any combination thereof.

31. The apparatus of claim 28, wherein the logic is further operable to cause the apparatus to:

transmit, to the memory device, first signaling indicative of a command address test (CAT) pattern;

receive, from the memory device, second signaling comprising feedback in response to the first signaling; and select a voltage reference (VREF) value for the channel that is between the host device and the memory device based at least in part on the second signaling, wherein the procedure for training the memory device comprises the transmitting, the receiving, and the selecting, and wherein the result of the procedure for training the memory device comprises the VREF value.

32. The apparatus of claim 28, wherein the logic is further operable to cause the apparatus to:

determine a difference between the result of the procedure for training the memory device and the reference value satisfies a threshold difference, wherein disabling the one or more features of the memory device is based at least in part on determining the difference satisfies the threshold difference.

33. The apparatus of claim 28, wherein the procedure for training the memory device comprises a procedure for aligning a clock of the memory device.

34. An apparatus, comprising:

a memory device; and logic coupled with the memory device and operable to cause the apparatus to:

perform a procedure for training the memory device based at least in part on a current metric for a channel that is between the memory device and a host device;

receive, from the host device, first signaling indicative of a command address test (CAT) pattern;

transmit, to the host device, second signaling comprising feedback for the first signaling;

receive, at the memory device and from the host device, third signaling indicative of a command based at least in part on a result of the procedure for training the memory device, wherein the result of the procedure for training the memory device is based at least in part on the second signaling; and disable one or more features of the memory device based at least in part on the command.

35. The apparatus of claim 34, wherein the procedure for training the memory device comprises receiving the first signaling and transmitting the second signaling.

* * * * *